United States Patent

Tayloe et al.

Patent Number: 5,095,500
Date of Patent: * Mar. 10, 1992

[54] CELLULAR RADIOTELEPHONE DIAGNOSTIC SYSTEM

[75] Inventors: Daniel R. Tayloe; Jeffrey D. Bonta, both of Arlington Heights, Ill.

[73] Assignee: Motorola, Inc., Schaumburg, Ill.

[*] Notice: The portion of the term of this patent subsequent to Jun. 11, 2008 has been disclaimed.

[21] Appl. No.: 600,570

[22] Filed: Oct. 19, 1990

Related U.S. Application Data

[63] Continuation of Ser. No. 447,455, Dec. 7, 1989, Pat. No. 5,023,900.

[51] Int. Cl.$^5$ .................. H04M 3/24; H04M 11/00; H04B 17/00
[52] U.S. Cl. ............................. 379/32; 379/59
[58] Field of Search ................. 379/32, 59, 58, 63, 379/133; 455/11, 9, 33, 54, 67

[56] References Cited

U.S. PATENT DOCUMENTS

4,415,770 11/1983 Kai et al. .............................. 379/32

OTHER PUBLICATIONS

AI and Communications Network Design, by Elaine P. Lusher, AI Expert, Aug. 1990, pp. 40–47.

*Primary Examiner*—Stafford D. Schreyer
*Attorney, Agent, or Firm*—Val Jean F. Hillman

[57] ABSTRACT

A system and method of evaluating the radio coverage of a geographic area serviced by a digital cellular radiotelephone communication system is described which comprises a plurality of base stations each having a transmitter and a receiver and a plurality of mobile units having co-located transmitters and receivers for transmitting and receiving communication message signals between the base stations and a mobile unit. During operation, the position of at least one of the mobile units operating within the geographic area is located when a call is received by a base station. The base station monitors the signal quality of the call and collects information relevant to the actual performance of the communication system. The mobile unit location and corresponding signal quality data are passed from the base station to a central operation and maintenance unit which collects the data, performs all necessary analytic and arithmetic computations, and provides a user-friendly representation of the characteristics of the radio coverage. With this representation of the radio coverage characteristics, the system operator can quickly and efficiently diagnose coverage deficiencies and take the necessary corrective action. By continuously monitoring subscriber calls and updating the pictographic representations, the system operator can actually observe the effect of the adopted modifications in a pseudo real-time fashion.

51 Claims, 3 Drawing Sheets

CELLULAR RADIOTELEPHONE DIAGNOSTIC SYSTEM

This is a continuation of application Ser. No. 07/447,455, filed Dec. 7, 1989, U.S. Pat. No. 5,023,900.

TECHNICAL FIELD

This invention relates to cellular radio communication systems, and particularly to cellular mobile radiotelephone systems. More particularly, this invention relates to techniques for using mobile subscribers operating within a cellular mobile radiotelephone system to assist in the diagnostic evaluation of system-performance.

BACKGROUND OF THE INVENTION

One of the most challenging puzzles associated with the management of a cellular radiotelephone communication system is faulty coverage recognition. The next is geographically locating an area within the zone of radio coverage or cell where the problem persists. For example, consider an area within a cellular radiotelephone system that provides poor service due to moderate levels of interference. Typically, this situation is uncovered in one of two ways: customer complaints, or the persistent drive team testing by system operators. Neither of these approaches, however, provides a very timely or comprehensive means of identifying, diagnosing, and curing the problem of faulty coverage.

In the past customer complaints have proven an unreliable means of identifying degraded services. Only a small population of the total subscriber community is in the practice of phoning in complaints. As a results, a considerable number of reportable incidences go unattended. This is an unfortunate phenomenon, for greater subscriber participation in faulty coverage reporting would provide an efficient and comprehensive means of faulty coverage identification due to the increased number of addressable complaints.

The use of drive team testing, while more precise than customer complaints, is a labor intensive process, that is expensive, time consuming, and often incomplete. Drive team testing requires dispatching a mobile unit into the selected zone of coverage to make first hand observation of system conditions. This reactive approach to performance evaluation, however, is extremely short sighted. Considering the average geographic area having radio coverage encompasses several square miles, even regular drive team testing is likely to overlook several problems. Furthermore, if the sought after problem is intermittent, it may totally escape the notice of even the most thorough drive team search. Another major shortcoming is the inability of drive team testing to observe the conditions in multiple zones of radio coverage simultaneously.

In response to these deficiencies, the cellular industry has turned to the aid of electromagnetic coverage prediction tools to assist in the search for holes in the coverage. One such coverage prediction tool is described in an article by D. L. Huff, "AT&T CELLULAR TECHNOLOGY REVIEW," IEEE International Conference on Military Communications, pp 490—494, 1985. According to this article, prediction tools "typically employ a propagation 'rule' of signal loss for relative heights of the transmit and receive antennas, the intervening terrain, and other special effects such as urban high-rise buildings, water, foliage, etc." The major drawback to this approach is that the prediction is only as good as the assumptions upon which it is made.

Another approach discussed in the Huff article concerns taking certain "live" power level measurements from active and inactive radio units. This approach, while gathering data on actual system performance, falls severely short of providing a comprehensive means of monitoring and diagnosing the state of a dynamic cellular radiotelephone communication system. Under Huff, signal level measurements are taken at the base site, while channel interference measurements are taken from "radios not in active use on calls." This data is then displayed via histogram representations. It will be appreciated by those skilled in the art, however, that Huff's approach possesses very limited capabilities. First, he is incapable of monitoring interference at the location of a mobile unit because all signal strength measurements are base site specific. Next, Huff can not monitor disruptive levels of interference on active channels during periods of peak use. Huff relates to an analog cellular system, thus the mobile radio must be inactive, "not in active use," in order to detect interference. During periods of peak use, cells commonly experience saturation, thereby leaving no inactive channels. Since interference during periods of peak use is of the greatest concern to system operators, Huff represents a tool incapable of addressing this interest. In addition, Huff is unprepared to provide user friendly displays depicting real-time change in the system coverage. Therefore, in order to perform an evaluative diagnosis of a cellular radiotelephone or other communication system, it is necessary to develop a complete history on actual system performance from the mobile unit perspective and to present that history to the system operator in a format chosen for ease of comprehension.

SUMMARY OF THE INVENTION

The present invention is briefly described as a method of evaluating the electromagnetic coverage of a geographic area serviced by a communication system. In the instant case the communication system is a digital cellular radiotelephone communication system having a plurality of base stations each having a transmitter and a receiver for transmitting and receiving communication message signals to and from a plurality of mobile units also having transmitters and receivers. In the present invention, the mobile units are those operated by system subscribers. During operation, the position of at least one of the mobile units operating within the geographic area is located when a call is received by the base station. The base station monitors the signal quality of this call and collects information relevant to the communication system's actual performance from the mobile unit's perspective. The mobile unit location and corresponding signal quality data are then passed from the base station to a central operation and maintenance unit which correlates the data, performs all analytic and arithmetic computations, and provides a computer generated representation of the characteristics of the electromagnetic coverage within the target geographic area. Armed with this view of the electromagnetic coverage, the system operator can quickly and efficiently identify deficiencies and take the necessary corrective actions. Moreover, by continually monitoring the subscriber calls and updating the graphical representations, a system operator can actually observe the effect of system modifications in a pseudo real-time fashion.

BRIEF DESCRIPTION OF DRAWINGS

FIG. 1 is a diagram of a communication system employing the electromagnetic coverage performance evaluation tool;

DESCRIPTION OF PREFERRED EMBODIMENT

FIG. 1 is a diagram of a communication system employing the disclosed electromagnetic coverage evaluation method and tool. Since it is understood by those skilled in the art that other components and devices are typically included in this environment, only those pertinent to the present invention will be discussed.

In the preferred embodiment the object 100 is an automobile or any other ambulatory device or entity capable of transporting a mobile or portable radiotelephone, hereinafter refered to as a mobile unit. The mobile unit is designed to communicate with base stations 101, 106, and 111 via radio frequency (RF) channels such that communication message signals are passed between the mobile unit and the base stations.

Particular methods of determining which base station will handle mobile unit transmissions are well known in the art. For examples, refer to Thro U.S. Pat. No. 4,607,906 and Menich et. al. U.S. Pat. No. 4,704,734 each assigned to the assignee of the present invention. Schloemer U.S. Pat. No. 4,736,453 discloses yet another base station frequency allocation scheme.

When a communication message signal or call is received by one of the base stations, the disclosed evaluation method teaches locating the position of the mobile unit. Mobile unit location may be determined by a host of radiolocation means which vary in their levels of sophistication from radio ranging to global positioning systems. According to the present invention, each base station is equipped with a locator 103, 108, and 113 which employs signal strength measurements and timing advance techniques for locating and tracking the position of mobile units engaged in active calls.

Mobile unit distances are ascertained from timing advance information. Timing advance is the round trip propagation time of a call travelling from the base to a mobile unit and back. From this information, the mobile unit's distance from the base is calculated. Once the mobile unit's distance from the base is known, mobile unit bearing is approximated by monitoring the signal strength levels of adjacent cells for omni-directional antennae, or adjacent sectors for sector-directional antennae. In order to track the position of a mobile unit, both the bearing and the distance data are collected and recorded at periodic rates. Refer to Maloney et. al. U.S. Pat. No. 4,728,959 and Sanderford et. al. U.S. Pat. No. 4,799,062 for examples of viable radiolocation techniques.

The mobile units refered to in the present invention are those operated by system subscribers, i.e. the ordinary everyday customer who uses cellular mobile radiotelephone services. Of importance, these mobile units, operating in a digital cellular environment, transmit calls to the various base stations using a Time-Division Multiple Access (TDMA). Since the communication resources required to transmit a call do not encompass the entire TDMA duty cycle, the mobile unit has idle time to perform additional tasks.

Each mobile unit is therefore designed to measure the signal strength and the signal quality of transmissions from the serving and adjacent base stations, and to report this data to the serving base station. Typically this information is used to permit the serving base station to regulate the process of switching the established call from one cell to another as the mobile unit travels from cell to cell. To the system operator, however, each customer now represents the opportunity to gather data concerning actual radio coverage from the mobile unit's perspective. Therefore, the purpose of locating a mobile is to pinpoint the area within a cell that possesses the electromagnetic characteristics revealed by the data gathered by that mobile.

The next step taught by the disclosed evaluation method is monitoring the signal strength and the signal quality of transmissions between the mobile unit and the base stations. According to the present invention, each base station is designed to receive incoming calls from mobile units and to measure the signal quality of the incoming calls. As previously mentioned, each mobile unit is designed to measure the signal strength and the signal quality of the calls transmitted by the servicing and adjacent base stations, and to report this data to the servicing base station. Monitoring is then typically a base station function which comprises collecting and correlating the received signal strength and signal quality data and comparing these parameters to expected values in order to determine their validity. Accordingly, monitoring allows the system operator to observe communication system performance during operation and to identify an incidence of degraded service, without waiting for subscribers to call in service complaints.

In effect monitoring maximizes subscriber participation during faulty coverage reporting. This increased participation will allow the system operator to virtually avoid the expense of drive team testing while enhancing the ability to critique system performance due to the sheer number of monitorable mobile units. Now, rather than waiting for subscribers to call in service complaints, the continuous monitoring of subscriber calls provides a reliable means of identifying each incidence of degraded services.

It will be appreciated by those skilled in the art that every call contains valuable information regarding the actual characteristics of the radio coverage at the location of a mobile unit. Therefore, information such as, but not limited to, transmitter power, transmitter frequency, mobile unit signal strength, mobile unit bit-error-rate, timeslot utilization, and signal to noise ratios are all relevant parameters that should be evaluated. From this information, specific characteristics concerning the adequacy of existing radio coverage can be deduced. For example, characteristics like: coverage area boundaries, signal strength contours, areas having no electromagnetic coverage, areas having poor signal quality, areas providing poor overlap, areas experiencing high handover failures, areas experiencing electromagnetic interference, traffic density distribution, average timeslot utilization, and average channel holding time are all readily ascertainable from monitoring subscriber calls. In addition, monitoring will reveal the effect dynamic power control has on the various mobile units. Dynamic power control is the ability the base station has to command the mobile unit to vary its transmission power as it nears the base.

Monitoring is performed at each base station via units 102, 107, and 112, which according to the present invention are modified mobile units possessing additional measuring capabilities. Theses devices are employed to report on the base station's ability to properly process cellular calls. In addition to the previously mentioned parameters, units 102, 107, and 112 should be capable of measuring and monitoring the following: Bose-Chadhuri-Hocquenghem (BCH) data validity and synchronization, TDMA frame validity, timing advance measurement checks, and the base station's modulator quality.

The combination of locating and tracking the position of several mobile units, while monitoring the calls from those mobile units creates the ability to map the radio coverage characteristics of a geographic area serviced by a cellular radiotelephone communication system. Based upon the location and the number of operational mobile units within an area, mapping can now be achieved at rates rapidly approaching real-time.

As base stations 101, 106, and 111 communicate with device 100, information concerning the mobile unit location and the resultant signal quality is gathered and passed along lines 104, 109, or 114 to the Operation Maintenance and Control Unit (OMCU) 116. The OMCU is a centralized management tool within the communication system which supports the basic operation and maintenance functions required by each serviced base station. Via the terminal 119 and the CRT display 118, a system operator can access base station 101, 106, or 111 and alter various system parameters such as: transmitter power, transmitter frequency, frequency assignments, or software algorithms. In addition the OMCU provides the mass storage 120 and necessary computing power to support these operations.

Careful review of FIG. 1 reveals that the evaluation tool 117 is mated with the OMCU. The evaluation tool performs the required statistical analysis and correlation which relates the mobile unit's position with the resultant signal quality. As a function of these actual measurements, the evaluation tool is capable of providing a computer generated representation of the characteristics of the electromagnetic coverage. These representations, graphical or tabular, are presented to the system operator via CRT displays 118 or 122. Armed with this information, the system operator can easily plan, diagnose, or optimize the electromagnetic coverage of that communication system.

When corrective actions are required, the system operator can initiate previously mentioned alterations from the OMCU. Hardware specific alterations like: increasing or decreasing antenna height, adding additional base stations, utilizing omni or directional antennae, or varying antenna shaping must be performed in the field. Upon completion, continuously monitoring subscriber calls within the affected area allows the evaluation tool to update the graphical representations for that areas. These updates, in turn, enables the system operator to quickly and efficiently evaluate the effectiveness of proposed solutions, and make additional changes as required.

Of course, the heavier the subscriber traffic in the area of interest, the quicker the rate of data collection and analysis. In essence, continually monitoring subscriber calls and updating the coverage maps permits the diagnostic evaluation of a cellular radiotelephone or other communication system at rates rapidly approaching real-time. In addition, by depicting the electromagnetic characteristics of several contiguous cells simultaneously, the system operator is capable of optimizing the electromagnetic coverage by performing a holistic analysis of the subject communication system.

It will be appreciated by those skilled in the art that the initiation of a corrective action, while exhibiting desirable effects in one cell, may compromise the service in adjacent cells. For example, assume increasing the transmitter power at base station 101 increases the cell 105 coverage area boundaries, thereby covering the hole at the mobile unit 100 location. While this appears to present a viable solution, it must be recognized that interference is now likely to appear in the surrounding cells as a result of this system modification. The disclosed method of coverage evaluation, however, conveniently provides the system operator the capability of observing the coverage in these surrounding cells. Consequently, faulty coverage identification can now be achieved in an extremely reliable fashion which facilitates the selection of corrective actions that provide both adequate coverage and minimal disruption to neighboring cells. Based upon the location and the amount of mobile unit traffic within the cells, coverage mapping at rates rapidly approaching real-time is available.

As an added service, the system operator will have virtual terminal access from any point in the network via terminal 121 and CRT 122. These interface devices may be portable, or dedicated as shown in the case of base station 106. This option is available because the entire base station network is connected by a 64Kb X.25-link for operation and maintenance traffic originating at the OMCU and terminating at the base stations. Accordingly, all capabilities that exist at the OMCU workstation will exist at any point on the base station network.

Figure 2:
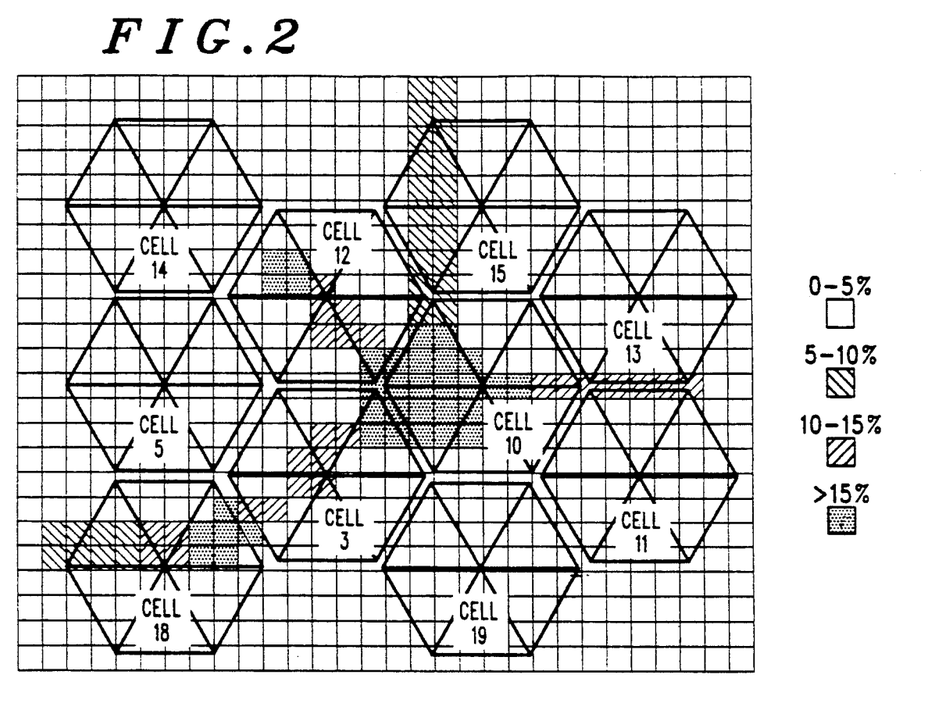
FIG. 2 is a graphical representation of the percentage of traffic density distribution across multiple cells during "rush hour;"

An example of a computer generated representation depicting a characteristic of electromagnetic coverage can be seen in FIG. 2. FIG. 2. is a graphical representation of the percentage of traffic density distribution across multiple cells during "rush hour." In this example the traffic density is measured as the average of the total number of calls handled in a cell over some unit of time; for example, one minute. As FIG. 2 indicates, the areas within each cell requiring concentrated radio coverage are those supporting the highways. Aided by this pictographic representation of traffic density, a system operator can make the necessary adjustments to provide coverage in the areas of excessive use.

Figure 3:
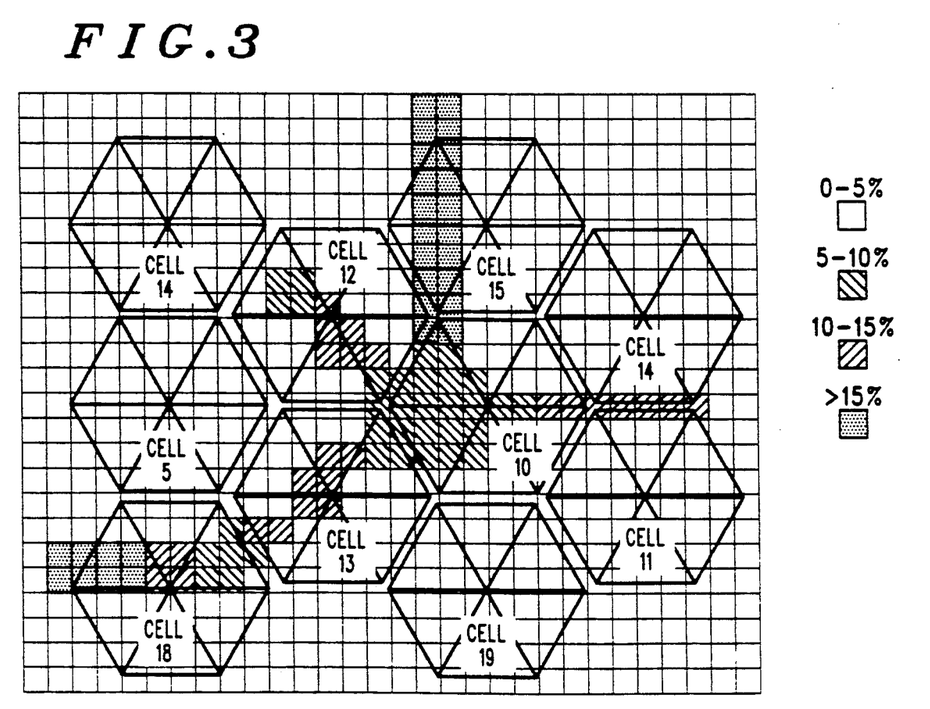
FIG. 3 is a graphical representation of the percentage of traffic density distribution across the cells of FIG. 2 during "normal working hours;"

FIG. 3 is a graphical representation of the percentage of traffic density distribution across the cells of FIG. 2 "normal working hours." As FIG. 3 indicates, the areas within each cell requiring concentrated radio coverage have moved to the office complexes housed within the various cells. The system operator can now make the necessary adjustments in RF planing in order to accommodate these differing traffic patterns.

Figure 4:
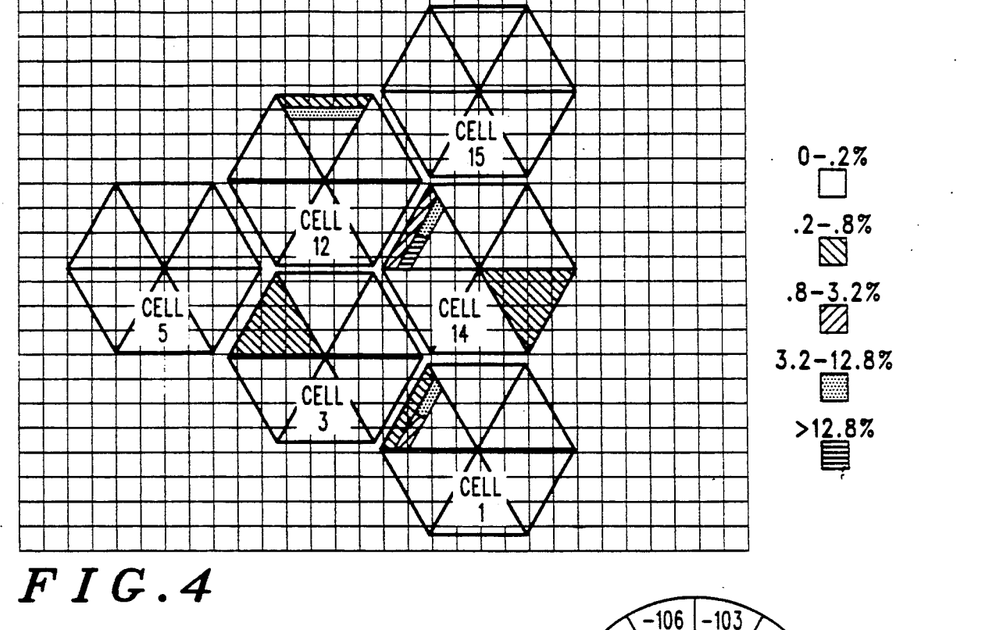
FIG. 4 is the graphical representation of the percentage of interference across multiple cells measured in Bit-Error-Rate.

FIG. 4 is the graphical representation o the percentage of interference across multiple cells measured in Bit-Error-Rate. In a similar fashion to FIG. 2 and FIG. 3, as coverage parameters vary due to changing environmental agents (e.g. cyclical rise and fall of foliage), the system operator will be able to once again vary the coverage to meet the changing need. From this representation a system operator can easily determine areas within the communication system having poor signal quality or not electromagnetic coverage.

Figure 5:
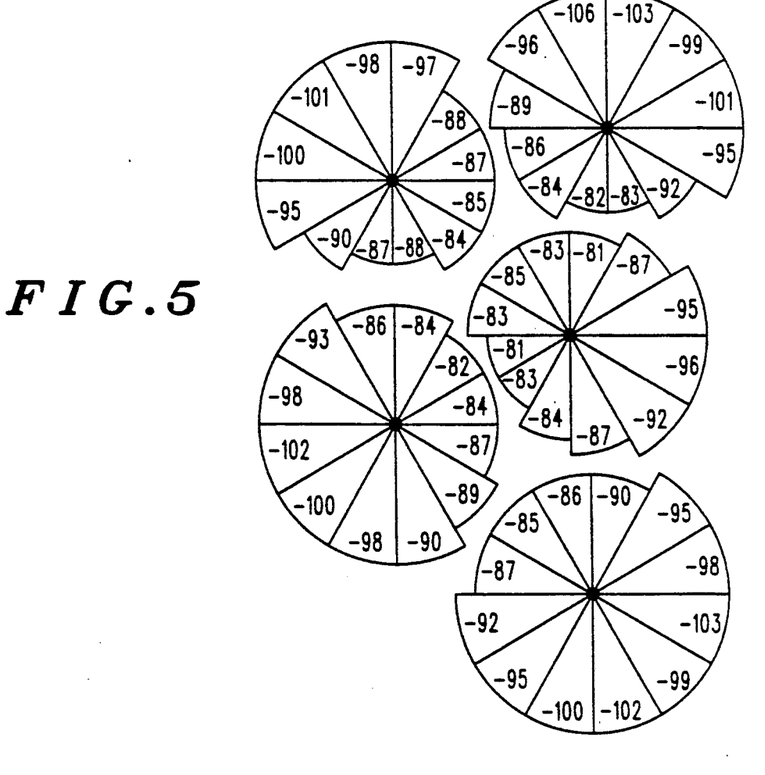
FIG. 5 is a pictographic representation of the interaction between several contiguous cells.

FIG. 5 is a pictographic representation of the interaction between several contiguous cells. From this representation a system operator can quickly determine the size of the various cells within the communication system, the signal strength levels at the various points of handoff, as well as areas providing poor overlap. In addition, should the information in this or any other computer generated representation experience a rapid change or degradation, the system operator can treat this occurrence as strong evidence of possible equipment failure. Thus the disclosed method and apparatus can assist the system operator in the maintenance and troubleshooting of system hardware as well.

Although the present invention has been described with reference to a particular embodiment, other embodiments will become apparent to those skilled in the art. It is therefore intended that the invention not be limited, except as indicated by the appended claims.

We claim:

1. A method of evaluating the electromagnetic coverage of a geographic area serviced by a communication system having a plurality of base stations each having a transmitter and a receiver for transmitting to and receiving communicating message signals from a plurality of mobile units each having transmitters and receivers comprising the steps of:

locating the position of at least one mobile unit operating within the geographic area;

monitoring the signal strength and the signal quality of transmissions between said base stations and the mobile unit; and adjusting the communication system coverage, based upon the actual coverage determined by monitoring, whereby an operator is assisted in planning, diagnosing, or optimizing the electromagnetic coverage of a communication system.

2. The method of claim 1 further comprising the steps of:

determining traffic density distributions across a geographic area of electromagnetic overage; and adjusting the electromagnetic coverage of the communication system to accommodate changing traffic patterns based upon the traffic density distribution for that geographic area.

3. The method of claim 1 further comprising the steps of:

determining a number of dropped calls in the geographic area of electromagnetic coverage over a time period;

calculating a percentage of dropped calls for a geographic area based on a total number of calls handled in that geographic area; and adjusting the electromagnetic coverage of the communication system to reduce the percentage of dropped calls in that geographic area.

4. The method of claim 3 further comprising the steps of:

identifying a last known position for at least some of the mobile units that drop calls;

grouping the identity of at least some of the last known positions; and adjusting the electromagnetic coverage of the communication system to service areas that have no electromagnetic coverage.

5. The method of claim 1 further comprising the steps of:

measuring signal strength levels for calls handled by a mobile unit operating within a geographic area of electromagnetic coverage;

calculating an average signal strength level for a geographic area based upon a total number of calls handled in that geographic area; and adjusting the electromagnetic coverage of the communication system to modify signal strength contours across the geographic area serviced by the communication system.

6. The method of claim 1 further comprising the steps of:

establishing mobile unit attenuation levels for calls handled by mobile units operating within a geographic area of electromagnetic coverage;

calculating an average attenuation level for a geographic area based upon a total number of calls handled in that geographic area; and adjusting the electromagnetic coverage of the communication system to modify the leveling effect of dynamic power control.

7. The method of claim 1 further comprising the steps of:

calculating an average signal strength level for a geographic area based upon a total number of calls handled in that geographic area;

calculating an average attenuation level for that geographic area based upon a total number of calls handled in that geographic area; thereby calculating average path losses for calls handled by mobile units operating within that geographic area based upon average signal strength levels and average attenuation levels; and adjusting the electromagnetic coverage of the communication system to account for actual signal strength levels absent the effect of dynamic power control.

8. The method of claim 1 further comprising the steps of:

locating handoff boundaries within the geographic area of electromagnetic coverage; and adjusting the electromagnetic coverage of the communication system to alter the zone of electromagnetic coverage.

9. The method of claim 1 further comprising the steps of:

locating zones of interference within the geographic area of electromagnetic coverage; and adjusting the electromagnetic coverage of the communication system to eliminate areas having poor signal quality.

10. The method of claim 1 further comprising the steps of:

determining an average holding time a plurality of mobile units operating within a geographic area of electromagnetic coverage remain on a channel; and comparing the average channel holding time of the plurality of mobile units to a threshold value for average channel holding time, whereby the operator can issue appropriate warnings.

11. The method of claim 1 wherein the step of locating the mobile unit comprises a radiolocation technique selected form the group consisting of:

radio ranging;

trilateration;

triangulation;

dead reckoning;
sign posting;
timing advance; and
global positioning systems.

12. The method of claim 1 wherein the step of monitoring the signal quality further comprises the steps of:
monitoring transmitter power;
monitoring transmitter frequency;
monitoring mobile unit signal strength;
establishing a mobile unit bit error rate;
determining signal-to-noise levels;
determining timeslot utilization; and
comparing the above measurements to expected threshold levels.

13. The method of claim 1 wherein eh characteristics of the electromagnetic coverage include, but are not limited to:
electromagnetic overage area size;
electromagnetic handoff boundaries;
areas having poor signal quality;
areas having no electromagnetic coverage;
areas providing poor overlap;
areas experiencing electromagnetic interference;
ares experiencing high handover failures;
traffic density distribution;
signal strength contours;
effect of dynamic power control;
average timeslot utilization; and
average channel holding time.

14. The method of claim 1 wherein the communication system is a system selected from the group consisting of:
cellular radio telephones;
digital cellular radio telephones;
satellite links;
infrared transmissions; and
in-building radio telephone systems.

15. The method of claim 1 wherein the electromagnetic coverage is a waveform selected from the spectrum consisting of:
radio frequency (RF);
infrared; and
microwave transmissions.

16. The method of claim 1 wherein the evaluation of the electromagnetic coverage of the geographic area is continuous.

17. The method according to claim 1 comprising the further steps of:
locating the position of at least some of the mobile units operating within a plurality of geographic areas;
tracking the position of the mobile units; and
altering system parameters to adjust the electromagnetic coverage, whereby an operator is assisted in planning, diagnosing, or optimizing the electromagnetic coverage of the communication system.

18. The method of claim 17 wherein the step of tracking the position comprises:
collecting distance and bearing data on at least some of the mobile units; and
recording the mobile unit positions at a periodic rate.

19. The method of claim 17 wherein the step of altering system parameters includes, but is not limited to:
increasing transmitter power;
decreasing transmitter power;
increasing base station antenna height;
decreasing base station antenna height;
adding additional base stations;
utilizing omni-directional antenna;
utilizing sector-directional antenna;
changing frequency assignments;
changing software algorithms;
changing algorithmic parameters; and
varying antenna shaping.

20. The method of claim 1 wherein the steps of collecting and recording occur over a plurality of geographic areas, to permit a holistic analysis of a communication system.

21. A method of evaluating the electromagnetic coverage of a geographic area serviced by a communication system having a plurality of base stations each having a transmitter and a receiver for transmitting to and receiving communicating message signals from a plurality of mobile units each having transmitters and receivers comprising the steps of:
locating the position of at last one mobile unit operating within the geographic area;
monitoring the signal strength and the signal quality of transmissions between said base stations and the mobile unit; and
presenting a pictographic representation of actual electromagnetic coverage determined by monitoring, whereby an operator is assisted in planning, diagnosing, or optimizing the electromagnetic coverage of that communication system.

22. The method of claim 21 further comprising the steps of:
determining traffic density distributions across the geographic area of electromagnetic coverage; and
presenting a pictographic representation of the traffic density distribution for the geographic area whereby an operator can adjust the electromagnetic coverage of the communication system to accommodate traffic patterns within the geographic area.

23. The method of claim 21 further comprising the steps of:
determining a number of dropped calls in the geographic area of electromagnetic coverage over a time period;
calculating a percentage of dropped calls for a geographic area based on a total number of calls handled in that geographic area; and
presenting a pictographic representation of the percentage of dropped calls in that geographic area.

24. The method of claim 23 further comprising the steps of:
identifying a last known position for at least some of the mobile units that drop calls;
grouping the identity of at least some of the last known positions; and
presenting a pictographic representation of the group, whereby an operator can identify areas that have no electromagnetic coverage.

25. The method of claim 21 further comprising the steps of:
measuring signal strength levels for calls handled by a mobile unit operating within a geographic area of electromagnetic coverage;
calculating an average signal strength level for a geographic areas based upon a total number of calls handled in that geographic area; and
presenting a pictographic representation of the average signal strength level in that geographic area, whereby an operator can observe signal strength contours across a communication system.

26. The method of claim 21 further comprising the steps of:
  establishing mobile unit attenuation levels for calls handled by mobile units operating within a geographic area of electromagnetic coverage;
  calculating an average attenuation level for a geographic area based upon a total number of calls handled in that geographic area; and
  presenting a pictographic representation of the average attenuation in that geographic area, whereby a system operator can observe the leveling effect of dynamic power control.

27. The method of claim 21 further comprising the steps of:
  calculating an average signal strength level for a geographic area based upon a total number of calls handled in that geographic area;
  calculating an average attenuation level for that geographic area based upon a total number of calls handled in that geographic area; thereby
  calculating average path losses for calls handled by mobile units operating within that geographic area based upon average signal strength levels and average attenuation levels; and
  presenting a pictographic representation of the unattenuated signal strength levels in that geographic area, whereby a system operator can observe actual signal strength levels absent the effect of dynamic power control.

28. The method of claim 21 further comprising the steps of:
  locating handoff boundaries within the geographic area of electromagnetic coverage; and
  presenting a pictographic representation of electromagnetic coverage size, whereby an operator can observe coverage size changes in response to system parameter modifications.

29. The method according to claim 28 wherein the pictographic representation of the electromagnetic coverage size includes signal strength levels at the handoff boundaries, whereby an operator can identify areas providing poor overlap between adjacent geographic areas having electromagnetic coverage.

30. The method of claim 21 further comprising the steps of:
  locating zones of interference within the geographic area of electromagnetic coverage; and
  presenting a pictographic representation of the zones of interference, whereby an operator can identify areas having poor signal quality.

31. The method of claim 21 further comprising the steps of:
  determining an average holding time a plurality of mobile units operating within a geographic area of electromagnetic coverage remain on a channel;
  presenting a pictographic representation of the average channel holding time; and
  comparing the average channel holding time of the plurality of mobile units to a threshold value for average channel holding time, whereby the operator can issue appropriate warnings.

32. The method of claim 21 wherein the step of locating the mobile unit comprises a radiolocation technique selected from the group consisting of:
  radio ranging;
  trilateration;
  triangulation;
  dead reckoning;
  sign posting;
  timing advance; and
  global positioning systems.

33. The method of claim 21 wherein the step of monitoring the signal quality further comprises the steps of:
  monitoring transmitter power;
  monitoring transmitter frequency;
  monitoring mobile unit signal strength;
  establishing a mobile unit bit error rate;
  determining signal-to-noise levels;
  determining timeslot utilization; and
  comparing the above measurements to expected threshold levels.

34. The method of claim 21 wherein the characteristics of the electromagnetic coverage include, but are not limited to:
  electromagnetic coverage area size;
  electromagnetic handoff boundaries;
  areas having poor signal quality;
  areas having no electromagnetic coverage;
  areas providing poor overlap;
  areas experiencing electromagnetic interference;
  areas experiencing high handover failures;
  traffic density distribution;
  signal strength contours;
  effect of dynamic power control;
  average timeslot utilization; and
  average channel holding time.

35. The method of claim 21 wherein the communication system is a system selected from the group consisting of:
  cellular radio telephones;
  digital cellular radio telephones;
  satellite links;
  infrared transmissions; and
  in-building radio telephone systems.

36. The method of claim 21 wherein the electromagnetic coverage is a waveform selected from the spectrum consisting of:
  radio frequency (RF);
  infrared; and
  microwave transmissions.

37. The method of claim 21 wherein the evaluation of the electromagnetic coverage of the geographic area is continuous.

38. The method according to claim 21 comprising the further steps of:
  locating the position of at last some of the mobile units operating within a plurality of geographic areas;
  tracking the position of the mobile units;
  altering system parameters to adjust the electromagnetic coverage; and
  updating the pictographic representations of the electromagnetic coverage characteristics as a function of altering, whereby an operator is assisted in planning, diagnosing, or optimizing the electromagnetic coverage of that communication system.

39. The method of claim 38 wherein the step of tracking the position comprises:
  collecting distance and bearing data on at least some of the mobile units; and
  recording the mobile unit positions at a periodic rate.

40. The method of claim 38 wherein the step of altering system parameters includes, but is not limited to:
  increasing transmitter power;
  decreasing transmitter power;
  increasing base station antenna height;

decreasing base station antenna height;
adding additional base stations;
utilizing omni-directional antenna;
utilizing sector-directional antenna;
changing frequency assignments;
changing software algorithms;
changing algorithmic parameters; and
varying antenna shaping.

41. The method of claim 38 wherein the step of updating the pictographic representations of the electromagnetic coverage characteristics comprises depicting the characteristics of a plurality of geographic areas, to permit a holistic analysis of a communication system.

42. An electromagnetic coverage performance evaluation tool for a communication system having a plurality of base stations each having a transmitter and a receiver for transmitting and receiving communicating message signals and a plurality of mobile units each having transmitters and receivers, said evaluation tool comprising:
   means for locating the position of at least one mobile unit operating within an electromagnetic coverage area;
   means for monitoring the signal quality of transmissions between said base stations and the mobile unit; and
   means for adjusting the communication system electromagnetic coverage based upon the actual coverage determined by monitoring, whereby an operator is assisted in planning, diagnosing, or optimizing the electromagnetic coverage of a communication system.

43. The evaluation tool according to claim 42 wherein the characteristics of the electromagnetic coverage are determined by monitoring the signal strength and the signal quality of transmissions between base stations and mobile units, and are not based upon theoretical propagation rules and preplanned geographical divisions.

44. The evaluation tool according to claim 42 wherein the characteristics of the electromagnetic coverage are not solely based upon signal strength measurements.

45. The evaluation tool according to claim 42 wherein the characteristics of the electromagnetic coverage are dependant upon mobile unit locations.

46. The evaluation tool according to claim 42 wherein the electromagnetic coverage is a waveform selected from the spectrum consisting of:
   radio frequency (RF);
   infrared; and
   microwave transmission.

47. The evaluation tool according to claim 42 wherein the locating means employs a radiolocation technique selected from the group consisting of:
   radio ranging;
   trilateration;
   triangulation;
   dead reckoning;
   sign posting;
   timing advance; and
   global positioning systems.

48. The evaluation tool according to claim 42 wherein the coverage of a plurality of geographic areas having electromagnetic coverage are simultaneously evaluated.

49. An electromagnetic coverage performance evaluation tool for a communication system having a plurality of base stations each having a transmitter and a receiver for transmitting and receiving communicating message signals and a plurality of mobile units each having transmitters and receivers, said evaluation tool comprising:
   means for receiving positional information on the location of mobile units operating within a geographic area of electromagnetic coverage;
   means for receiving the signal quality of transmissions between said base stations and the mobile unit; and
   means for presenting a pictographic representation of actual electromagnetic coverage within a geographic area, based upon receiving position and signal quality, whereby an operator is assisted in planning, diagnosing, or optimizing the electromagnetic coverage of that communication system.

50. The evaluation tool according to claim 49 wherein a plurality of geographic areas having electromagnetic coverage areas are simultaneously evaluated.

51. The evaluation tool according to claim 49 wherein the characteristics of the electromagnetic coverage are dependent upon mobile unit location.

* * * * *

UNITED STATES PATENT AND TRADEMARK OFFICE
CERTIFICATE OF CORRECTION

PATENT NO. : 5,095,500

DATED : 3/10/92

INVENTOR(S) : Tayloe et al.

It is certified that error appears in the above-identified patent and that said Letters Patent is hereby corrected as shown below:

Col. 8, line 65, change the word "form" to --from--

Col. 9, line 18, change the word "overage" to --coverage--

Col. 10, line 63, change the word "areas" to --area--

Col. 12, line 48, change the word "last" to --least--

Signed and Sealed this

Thirty-first Day of August, 1993

Attest:

BRUCE LEHMAN

*Attesting Officer*  *Commissioner of Patents and Trademarks*